Figure 1:
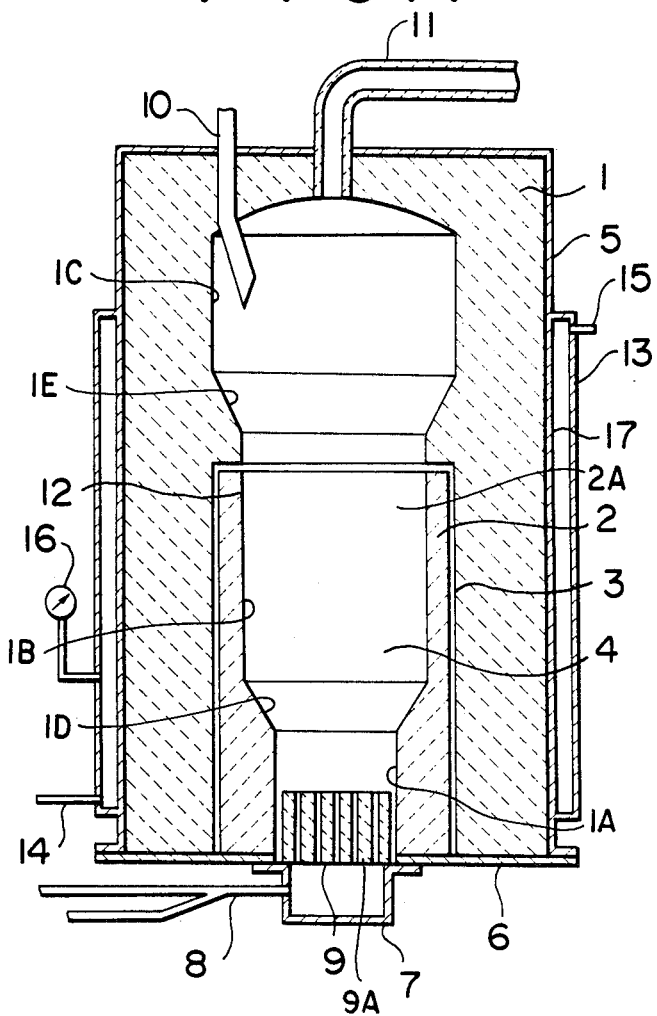

United States Patent [19]

Ishizuka

[11] Patent Number: 4,595,573
[45] Date of Patent: Jun. 17, 1986

[54] CHLORINATOR FURNACE AND METHOD FOR PRODUCING TETRACHLORIDE OF SUCH METALS AS TITANIUM AND ZIRCONIUM

[76] Inventor: Hiroshi Ishizuka, 19-2, Ebara 6-chome, Shinagawa-ku, Tokyo, Japan

[21] Appl. No.: 701,667

[22] Filed: Feb. 15, 1985

Related U.S. Application Data

[63] Continuation of Ser. No. 365,525, Apr. 5, 1982, abandoned.

[30] Foreign Application Priority Data

Apr. 20, 1981 [JP] Japan ................... 56-58451

[51] Int. Cl.$^4$ ................... C01G 23/02; C01G 25/04
[52] U.S. Cl. ................... 423/76; 423/74; 423/79; 422/139; 422/239; 422/242
[58] Field of Search ................... 423/74, 76, 79

[56] References Cited

U.S. PATENT DOCUMENTS

| 3,067,005 | 12/1962 | Nelson et al. | 423/79 |
| 3,074,777 | 1/1963 | Cortes | 423/79 |
| 3,867,505 | 2/1975 | Bowers et al. | 423/79 |

FOREIGN PATENT DOCUMENTS 613198  1/1961  Canada ................... 423/79

Primary Examiner—H. T. Carter
Attorney, Agent, or Firm—Larson and Taylor

[57] ABSTRACT

A method for producing tetrachloride of a metal selected from the group consisting of titanium and zirconium comprising: providing a reaction chamber which is defined by a wall structure of refractory material and arranged in an airtight encasement of metal, said reaction chamber comprising a reaction zone ranging downwards from an intermediate level thereof, said encasement including a jacket formed of a double wall construction around the reaction zone, communicating means between the inside of said jacket and said reaction chamber, heating said reaction chamber, filling said jacket with a gas, introducing a solid reaction mixture comprising a compound of the metal to be chlorinated, supplying a gas mixture comprising chlorine to said reaction zone through a tube connected to the chamber bottom to cause reaction at a positive pressure over the atmosphere to produce the tetrachloride of the metal, maintaining a positive pressure relative to the atmosphere in both said jacket and said reaction chamber and a pressure is in the jacket higher than that within said reaction chamber so as to provide a continuous stream of gas to flow into said reaction zone via said communicating means to sweep vapor of chlorine and chlorides away from the inside face of the encasement and thereby protect it from attack.

2 Claims, 2 Drawing Figures

CHLORINATOR FURNACE AND METHOD FOR PRODUCING TETRACHLORIDE OF SUCH METALS AS TITANIUM AND ZIRCONIUM

This application is a continuation of application Ser. No. 365,525 filed Apr. 5, 1982, abandoned.

The present invention relates to an improvement in chlorinator furnace construction as well as a method for producing tetrachloride of such metals as titanium and zirconium especially adapted to the furnace.

For the industrial production of metal chlorides by conversion from oxide or carbide, a furnace construction is essentially employed which securely isolates from the atmosphere, especially gaseous and vaporous components such as chlorine chloride products, in order to prevent possible environmental pollution and to avoid possible lowered product recovery caused by leakage of the gas and products, as the chlorine in itself is poisonous to human health as well as corrosive, while the both yield, in the presence of water hydrochloric acid which is also poisonous and still more corrosive.

Furnace setups directed to such applications generally comprise a wall structure of refractory bricks, encased in an iron shell to secure an airtight closed space for treatment. Here, means are taken to minimize contact of shell material with the corrosive gas of chlorine, for example, by employing bricks of most dense structure available to build the wall and, at the same time, by providing a close sealing between each brick. Mortar packing as well as improvement of brick geometry are considered effective for such purpose.

Mortar packing, employed more usually than the latter, contains rather much water which is hard to completely remove out from the furnace. Although the furnace is heated from inside to an elevated temperature in a drying up step on completion of the furnace construction, water content in wall materials evaporates only to go out partly from the furnace, while the rest condenses back to liquid on the inner surface of the iron shell where temperature is comparatively low. Since no means conventionally has been provided to evaporate again such condensate, rather much water tends to stay in the furnace until after the latter is running.

Although the other alternative, use of bricks of improved geometry, is technically possible, practice of this method involves increased capital cost, due to a high precision work required in the manufacture of such bricks, as well such as a troublesome step as rubbing against each other or others to produce improved flatness also in construction of the furnace. In addition, anyway, the problem due to water content in the bricks themselves cannot be avoided even with such measures.

When water, thus trapped inside the iron shell, comes in contact with either chlorine gas, introduced for chlorination run, or chlorides produced, chlorine ion ($Cl^-$) is yielded to be principal a cause of corrosion to pierce the shell of conventional design material. With a hole once formed in the shell, an accellerated attack will follow in vicinity by chlorine as combined with humidity in the atmosphere.

For avoiding expansive damage to the furnace shell and leakage of poisonous chemicals, operation should necessarily interrupted for repairment. Conventional treatment by welding leaves a thermally affected region in the material which is thus under concentrated stresses and very vulnerable to corrosion. More unfavorably, such corrosion will prevail in a region which is close to a furnace portion allotted for the substantial reaction and thus exhibits comparatively high temperature.

Meanwhile, for an industrial production of chloride of such metals as titanium and zirconium, a fluidized bed reaction is preferably employed in a chlorinator furnace for an increased treatable capacity relative to the volume of furnace, extensively continuable run and simplified maintainance. A few of such processes are known from U.S. Pat. Nos. 3,074,777, 3,867,505. However, due to rather a large capacity of heat carried away by effluent gaseous materials and radiation, it is often the case with a reaction system of a small heat generation that maintainance of the required temperature level, therefore sustainance of the chlorination itself, becomes very difficult or sometimes actually impossible under most closely regulated conditions especially with a furnace of small construction. For a reaction of this type, a furnace geometry critically influences on such parameters particularly as gas flow rate to provide optimal reaction conditions. With occasional variation in mass and nature of charge to be treated calling for regulation of chlorine proportion of gas mixture, and since the change of gas composition often tends to instabilize the thermal balance of the system, a substantial change of gas composition, therefore the treated volume, is practically impossible with conventional techniques which only can operate at an atmospheric or even negative pressure.

Thus one of the objects of the present invention is to provide a chlorinator furnace which is free of above described drawbacks, and particularly to such furnace which exhibits a substantial flexibility in treatment rate from the minimum which is inadequate by prior art to sustain the reaction, up to a substantially raised maximum using a single furnace.

Another object is to provide such furnace which permits a continued run over a substantially extended period, with chemical damage from inside to the encasement and, thus, downtime for repairment considerably decreased.

Still another object is to provide a method for producing chloride of titanium, zirconium or the like, which is suitably practised especially with such furnaces.

According to the invention there is provided in a method for producing tetrachloride of such metal as titanium and zirconium in either fixed or fluidized bed process, in which a solid charge comprising compound of corresponding metal is converted to the chloride while in contact with an upward stream of gaseous charge comprising chlorine, within a reaction chamber defined by a wall structure of refractory material and closed hermetically with an encasement of metal, the improvement in which said gaseous charge is introduced to the reaction chamber at such a rate as to allow the process to proceed under a pressure over one atmosphere in said chamber, while said chamber is pressurized from outside with a jacketing gas, which is held at a pressure over one atmosphere and close to the pressure in the chamber, on the encasement around said chamber, so as to substantially decrease the pressure differential between inside and outside the encasement wall which closes the chamber firsthand.

Also provided is a furnace comprising: a wall structure substantially consisting of refractory material which provides inside a vertically elongated reaction chamber which, in turn, includes a substantially cylindrical reaction zone ranging down from an intermediate level of the reaction chamber, an encasement of iron sheet to cover a substantial part of said wall structure, a duct means for exhausting gases, connected to said reaction chamber at an upper portion thereof, a tube means for supplying regulated flow of gases containing chlorine, connected to the reaction chamber at a bottom thereof, a pipe means for introducing solid materials into the reaction zone, extending through the encasement and wall structure and provided with pressure regulating means, a jacket means which is provided as adjacent to the wall structure and extending axially about the reaction zone and which has an inner wall perforated with at least one pin holes for flowing gas, held in the jacket, out towards the wall structure, and a means for regulating a pressure in the jacket within a given range while such outflow of gas therefrom.

The first and second furnaces are suitably operated according to the invention by a method for producing tetrachloride of such metals as titanium and zirconium, comprising: heating a reaction chamber which is defined by a wall structure of refractory material and placed in an airtight encasement of metal, introducing solid reaction mixture comprising compound of metal to be chlorinated in said chamber, and supplying, through a tube means connected to the chamber at a bottom thereof, gaseous mixture comprising chlorine gas for initiating a reaction to produce tetrachloride of the metal, said reaction proceeding substantially in a reaction zone defined as ranging down from an intermediate level of the chamber and jacketed with a gas isolated from the atmosphere and regulatable of pressure and temperature thereof, said reaction being caused under a pressure condition close to that which is applied by said jacketing gas to the encasement around the reaction zone and which is positive relative to the atmosphere.

In the invention a chlorinator furnace may have an inside space, or a reaction chamber, formed, for example, straight cylindrical over a substantially whole length, or in two or more cylindrical parts of different diameters combined together with a funnel provided therebetween. Such space is connected, for exhausting gases, with a duct at a top portion thereof and a pipe for supplying such reactant and carrier gases as chlorine, oxygen and inert gases at a bottom thereof through a diffuser block of refractory. An electro-resistive heater of graphite, for example, may be arranged in cases of rather a small size furnace for assistance to sustain the chlorination reaction. At an upper level of the chamber there is provided a means for charging solid raw materials such as, for example, oxide or carbide material in mixture with coke.

As described above, a chlorinator furnace according to the invention has a metallic encasement, particularly of iron, to provide a jacket defined by a double wall construction over such a range as being close to the reaction zone or a portion of the reaction chamber where a chlorination reaction is to take place prevailingly. Thus, the minimum area to be covered with the jacket varies with the furnace designs in question. Such least jacket arrangement achieves a substantial improvement in service life and a practical prevention of environmental pollution, permitting operation at somewhat raised pressure conditions; while the furnace is preferably jacketed on an extended area including the minimum for a higher safety, and best encased as a whole in the jacketed shell so that advantages described later may be obtained in addition to further improved safety.

The cavity of the jacket, although possible to be unitarily formed, preferably can consist of lateral sections which are regulatable of gas flow independently from each other so that gas convection thereinside may be discouraged, and the gas filled inside may serve as a thermal insulative. Some of such sections may be stuffed with solid heat insulative substances, as described later, for a promoted effect. The cavity also is divisible to provide a double jacketed construction with a coaxially arranged cylindrical partition within, in order to achieve an additional effect, around the reaction zone of the chamber.

The innermost wall of the jacket may be provided in some cases with tiny through holes (pin holes) of a bore on the order of some 1 mm, formed artificially in advance at levels within the reaction zone so that the gas held in the jacket or jacket section may flow into the encasement. This construction, as combined with means for keeping the gas, which is essentially harmless to the chlorination reaction in the chamber, at a positive pressure over inside the encasement provides a continuous stream of gas to sweep vapor of chlorine and chlorides in the vicinity of the holes and protect the inside face of the encasement from attack by such chemicals. Such perforation, though applicable to a single unitary jacket construction, is advantageously provided on a section of the jacket, which is pressure regulatable independently from the rest, and operated most readily with a double jacket design.

Gases suitably filled in the jacket, intended or not for an influx to inside the encasement, include same materials as employed in the reaction chamber; nitrogen, air, argon and carbon dioxide in dry state, as well as an exhaust gas from the furnace top without chlorine or chloride products. Such gas is filled at a positive pressure relative to the atmosphere by some 0.5 $Kg/cm^2$. The sweeping effect of chlorine and chloride is also expected with a stream of jacket gas through similar holes formed in situ by attack by the chlorine and/or chloride from inside.

Most advantageously, a chlorinator furnace of the invention as described above is run at a positive pressure close to the level of the jacket gas which is kept positive to the atmosphere.

Incidentally the thus provided jacket can be run in the following ways: a hot air is introduced and filled in the jacket to warm and dry refractory wall from around while heating normally from inside on completion of the furnace setup, so that water content in wall materials such as bricks and mortar, may be substantially removed from the inside space of the encasement during this drying process of initial drying, or at latest, shortly after the furnace has been heated to start up a chlorination run, thus an environment can be provided which is substantially free of water to cause above mentioned troubles; evolution of a corrosive gas of hydrochloric acid and decreased yield of chloride product; as a result of this the furnace performs a substantially improved productivity due to a considerably decreased labor and downtime for repairment as well as an increased yield of chloride. Here, the temperature level on the inner surface of the iron encasement desirably should not exceed approximately 150° C. for suppressing possible attack by chlorine gas.

As briefly referred above, the gas filled in the jacket serves also as heat insulative and such effect improves as the jacket cavity is divided into sections for blocking gas convection inside and/or packed with solid heat insulative, such as silica wool and perlite. These measures are especially effective with rather a small size furnace where a capacity of heat to be generated by the reaction itself is too low to sustain the reaction by conventional techniques.

When the furnace is run with a charge which generates an excessive heat, a cold air instead can be forced into the jacket and continuously exhausted through a regulator valve thereon, thus cooling the wall of refractory, so that treatment may be practised at a raised rate.

As described above in particular, the jacket means provided according to the invention on a metallic encasement of the furnace can be used primarily as a protection shield for a reaction proceeding in the furnace at a raised pressure against the atmosphere; in addition the jacket also can be used in various ways, for example, for regulation of the thermal circumstances of the reaction by utilizing the jacket gas as medium for insulation, supplemental source or remover of heat, as well as a sweeping means for chlorine and chloride gases in the vicinity of the metallic encasement. By combining such functions as necessary and using a pressure condition effectively adapted to the nature of the particular reaction system, the invention permits optimally regulated thermal conditions to be readily established in the furnace.

In this way with a furnace of rather decreased dimensions, a heating means considered heretofore essential to the furnace of this type, is no more indispensable, so that a considerably simplified and compact furnace construction is now available according to the invention.

Although the above description is directed to fluidized bed reaction, it is obviously understood that the techniques herein disclosed is also applicable to other type of such reaction as run in a fixed bed.

Figure 2:
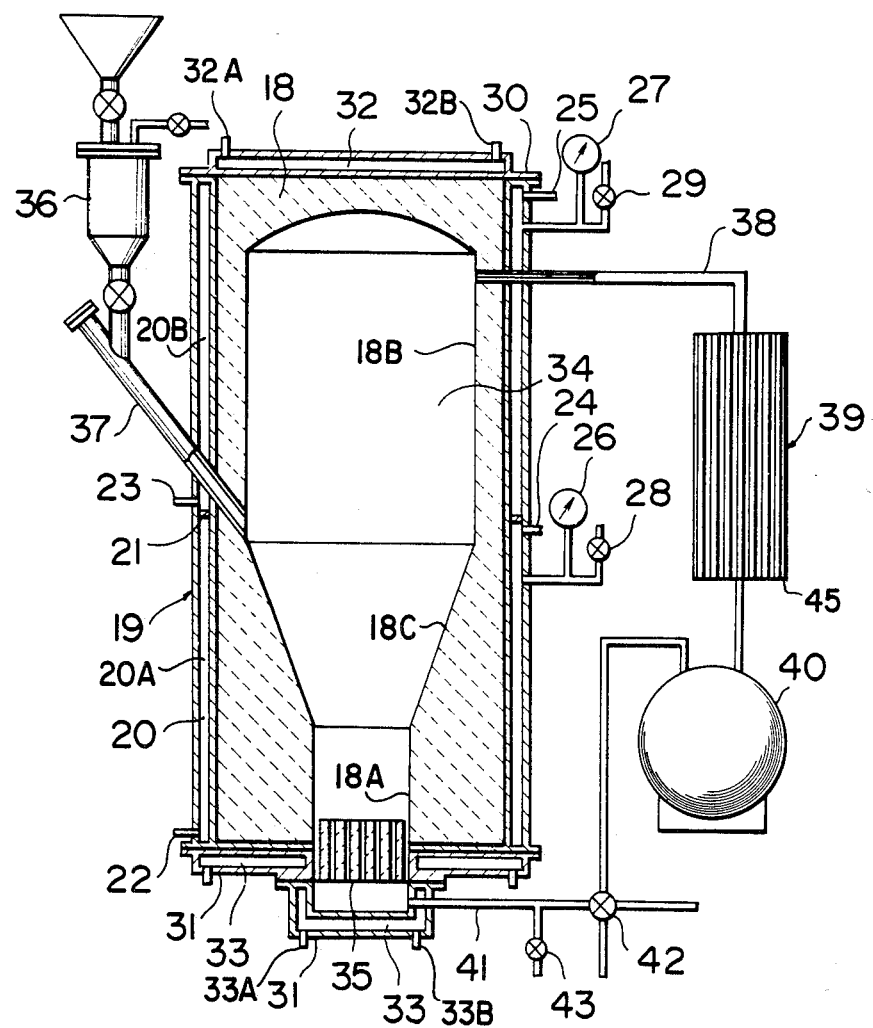

Other features of the invention and advantages performed thereby will be better understood from the following description taken in connection with the accompanying drawing which is given by way of example only and not for limiting the invention. Of the drawing:

FIG. 1 illustrates a schematic sectional view of a chlorinator furnace constructed according to the invention especially of rather a small size, while FIG. 2 show such view of another furnace construction of the invention of rather increased dimensions.

Particularly in FIG. 1, a wall structure 1 of, for example, silicate bricks has a substantially cylindrical outer face and an inner face consisting of three cylindrical portions 1A, 1B, 1C of upwards increasing diameters, connected with adjacent funneling faces 1D, 1E. A heater 2 of, for example, graphite is placed inside the structure 1 in some cases of rather a small size furnace, extending from the bottom to a mid-length of the structure 1 and accomodated in a recess 3 to provide an inner face substantially continuous with the structure, thus defining, a reaction chamber 4. The wall structure 1 is enveloped as a whole in an encasement or shell 5 of metal, typically iron, and closed at the bottom with a plate 6 of such metal and a lid 7 so that a substantial airtight isolation is provided for the chamber 4. The latter is connected, for supplying chlorine gas mixed with an inert carrier gas, with a tube 8 in the lid 7 through a diffuser block 9, which consists of refractory perforated with a number of narrow holes 9A so as to allow a dispersed passage of gas, while pipes 10, 11 are connected in a top portion, respectively, for introduction of solid materials of metal oxide or carbide material and coke, and for exhausting and leading gas mixture comprising chloride product, carbon oxides, inert carrier gas and chlorine as unconsumed to a condensing unit (not shown). In this construction a substantial process of chlorination is designed to proceed in the reaction zone 2A defined inside the heater 2 along the upper cylindrical portion 12 of the inner face.

The encasement 5 has a double walled portion to provide a jacket 13 where gas is filled or passed through an inlet 14 and outlet 15, with a pressure gauge 16 indication, in dependence on the particular applications. In this particular illustrated design the jacket 13 is arranged to cover a somewhat wider area than just from the upper to lower end of the reaction zone. The inner wall 17 of the encasement in some cases is provided with pin holes at an angle in an area adjacent to the reaction zone for gas stream towards the wall structure spaced.

In FIG. 2, similarly to FIG. 1, a wall structure 18 of silicate bricks has a substantially cylindrical outer face and placed along all the length in a metallic cylinder 19, which is constructed as double walled to provide a jacket 20 over a whole length. The jacket consist of two sections 20A, 20B separated with a horizontal partition 21 and has a gas inlet 22, 23 and outlet 24, 25 as well as a pressure gauge 26, 27 and pressure regulator valve 28, 29 on each section. The cylinder 19 has each of top and bottom ends airtightly closed with the respective lids 30, 31, each formed as double walled to make a jacket 32, 33. These jackets on the lids may have an inlet 32A, 33A and outlet 32B, 33B for gas passage.

The wall structure 18 has, for defining a reaction chamber 34, inside, an inner face of generally upwards widening cross section and consisting of two cylindrical portions 18A, 18B connected with a funneling face 18C. At a bottom of the chamber 34 a diffuser block 35 of perforated refractory is placed for dispersing gaseous materials supplied therethrough. For feeding solid materials a loader 36 and a pipe 37 in this connection are provided with the latter extending through the jacketed cylinder 19 and the wall structure 18 into a vicinity of a top of funneling. Another pipe 38 is connected to an upper portion of the chamber for leading gases comprising chloride product, unreacted chlorine and so forth, through a condenser unit 39 to a reservoir tank 40 for the product. In this illustrated example a tubing is so arranged as to connect the reservoir tank 40 with a gas supplying tube 41 through a valve 42 for recycling the gas portion passing the condenser as carrier gas to be mixed with chlorine incoming through a valve 43 and introduced to the chamber 34 through the tube 41 connected to the bottom lid 31. For washing gases released from the system a tower (not shown) is provided.

Although not essential, the condenser unit 39 may have a jacket 45 thereon through which cooling medium is circulated at a negative pressure relative to the inside, so as to improve product recovery as well as environmental protection. For production in this way of titanium tetrachloride and similar chlorides which exhibit rather a low boiling point, a product fraction passing the unit can be substantially reduced to achieve an improved product recovery, by thus cooling the condenser by means of water or other effective coolant to be used in an industrial refrigerating system. Here, since the jacket coolant pressure is kept lower than inside the condenser as said above, accidental gas leakage from the latter will not effect chloride to be recovered, and further leakage to the atmosphere is effectively blocked.

EXAMPLE 1

A furnace basically shown in FIG. 1 was employed but that wall material was placed in the site of saved heater thereinside. A wall of silicate bricks measuring 2.5 m in O.D., 7.5 m in length and 75 cm in thickness at the bottom was arranged in an entirely double walled encasement of 12 mm thick iron sheet. The cavity of the jacket 3 cm wide, radially, was partitioned horizontally into two sections, in the inner wall of which six through holes of 1 mm bore was provided at an angular spacing of 60 degrees, at a level of 80 cm from the wall bottom. The furnace was first loaded with powdered coke onto which air was blown to burn the former through a diffuser block at a rate of 2000 to 3000 liters/min., thus heating the chamber, while each section of the jacket was filled with air to a pressure positive by 0.1 Kg/cm$^2$ over that inside the encasement (0.2 to 0.3 Kg/cm$^2$ by gauge). Then powdered mixture of rutile and coke was charged to form a fluidized bed. On stabilization of the bed gas supply was switched to a mixture of chlorine and oxygen; such chlorination run was continuously operated thereafter by feeding the solid materials and gas mixture as well as the air in the jacket for a period of some one year, in comparison with just a few months achievable by conventional techniques.

EXAMPLE 2

A furnace construction, substantially shown in FIG. 2, was used. A wall structure of silicate bricks measured 2.5 m in O.D., 4 m in length and 1 m in smaller I.D. At the bottom a diffuser block was arranged so as to leave 1 m long straight cylindrical portion thereabove in this adjacence. Such wall structure was arranged in a cylinder of carbon steel sheet 4 m long and 12 mm thick, which had a jacket 3 cm wide, radially, up from the bottom to a level of 2.5 m. The top lid had a double walled construction likewise.

After the chamber was heated by burning coke and a warm air was filled in the jacket, powdered mixture of rutile and coke was charged therein to form a fluidized bed. On stabilization of the bed, supplied gas was switched from air to a mixture of chlorine and oxygen, thus a temperature of approximately 850° C. was reached in the reaction zone, then pressure there was raised to 1.0 Kg/cm$^2$ (by gauge), while keeping a pressure differential of some 0.3 Kg/cm$^2$ positive to that in the jacket. The gaseous materials leaving the chamber were removed of titanium tetrachloride component in a condenser and then mixed with chlorine to be supplied from the bottom of the chamber. At this point the temperature was sufficiently raised, requiring no oxygen to be fed. The jacket on the condenser was cooled and kept at 5° C. and 0.8 Kg/cm$^2$ (by gauge); titanium tetrachloride condensate was transferred to a reservoir tank. Process was continued by supplying raw materials and gas mixture in the chamber at a monthly operation rate of 95%. In this way 420 (short) tons of titanium tetrachloride was produced per month, and a continued run of as long as two years was achieved at such raised pressure.

In comparison a conventional furnace of similar dimensions as run at a positive pressure of 500 mm Aq only produces 200 tons of titanium tetrachloride per month at a typical monthly operation rate of 87%, while average life of wall bricks only spans 10 months.

EXAMPLE 3

A similar process to that in Example 2 was conducted but using an encasement design which had a jacket provided all over the length. After the chamber was heated by burning coke with air blown from the bottom and that the jacket was filled with dewatered air, powdered mixture of rutile and coke was charged to make a fluidized bed. On stabilization of the bed chlorine gas was substituted for the air, while an air of a room temperature was passed through the jacket at a pressure of 1.8 Kg/cm$^2$ (by gauge) to cool the wall from outside. Process was continued at a positive pressure of 2.0 Kg/cm$^2$ (by gauge) for about a month, by regulating the flow of air through the jacket so as to obtain a temperature level of 900° C. in the reaction zone and one not exceeding 500° C. at the furnace top. 630 tons of titanium tetrachloride was produced monthly at an operation rate of 95%.

As described above in detail, the invention by which a process is primarily allowed to operate at a raised pressure condition, permits the following advantages to be achieved:

1. A reduction of plant investment is attained, since the gas phase decreases in volume per mass and thus a furnace of a given volume is allowed to introduce an increased mass of gas for the process;

2. A facilitated regulation of fluidized bed is attained in stabilization of the bed as well as reaction process, due to a decreased difference in density from the solid materials such as oxide or carbide and coke, as a result of a raised density of the gas;

3. Since the parameters to deposit incoming chloride product in a condenser are independent from the mass of such chloride, the invention, by allowing to feed the condenser chloride at a rate several times as high as achieved by conventional techniques, permits an accordingly improved chloride recovery;

4. Since the gas phase improves in thermal conductivity, maintainance of required temperature level is readily realized;

5. A decreased heat loss can be achieved. This, as combined with an increased heat generation per volume to be treated, further facilitates maintenance of the temperature conditions;

6. As a substantially widened range of pressure is now available for the process, optimal thermal conditions can be readily established using the parameters selected as necessary. As a result:

a. A substantially widened treatment rate is available without a considerable change of gas composition which critically effects the thermal balance of the reaction system;

b. Baddellyite ore is now available as raw material, which has been heretofore considered inadequate to treatment due to insufficient heat generation for sustaining the reaction;

c. A stabilized reaction is readily achievable with a small size furnace.

7. The jacket can be used as a worming means to supply additional heat to the reaction zone. Thus a heater essentially used inside the furnace of a small size construction can be saved so that a simplified furnace construction is obtained.

8. Reaction temperature is readily maintained when the jacket is used for heat insulation as partitioned into sections and stuffed with solid heat insulative substances.

9. By filling the jacket with a warm air during the drying-stepup on completion of the furnace setup, water content, a principal cause for corrosion of metallic encasement, is substantially removed from the furnace, thus saving a labor and downtime for repairment.

10. When the jacket has pin holes formed in the inner wall of the jacket which is filled with a gas harmless to the reaction system, the gas flows in to sweep chlorine and chloride vapor in this vicinity to protect the material from their attack.

Further gas jacketed furnace construction of the invention effectively protect to secure clean working environment in case of accidental corrosion of the inner wall of the encasement, by preventing gas leakage to the atmosphere.

What is claimed is:

1. A method for producing tetrachloride of a metal selected from the group consisting of titanium and zirconium, comprising: providing a reaction chamber which is defined by a wall structure of refractory material and arranged in an airtight encasement of metal, said reaction chamber comprising a reaction zone ranging downwards from an intermediate level thereof, said encasement including a jacket formed of a double wall construction around the reaction zone, communicating means comprising holes between the inside of said jacket and said reaction chamber, heating said reaction chamber, filling said jacket with a gas, introducing a solid reaction mixture comprising a compound of the metal to be chlorinated, supplying a gas mixture comprising chlorine to said reaction zone through a tube connected to the chamber bottom to cause reaction at a positive pressure over the atmosphere to produce the tetrachloride of the metal, maintaining a positive pressure relative to the atmosphere in both said jacket and said reaction chamber and a pressure is in the jacket higher than that within said reaction chamber so as to provide a continuous stream of gas to flow into said reaction zone via said communicating means to sweep vapor of chlorine and chlorides away from the inside face of the encasement and thereby protect it from attack.

2. The method as claimed in claim 1, in which said gas comprises at least one selected in dry state from air, nitrogen, argon, carbon dioxide, and an exhaust gas from the reaction chamber free of chlorine and chloride.

* * * * *